(12) United States Patent
Landolsi et al.

(10) Patent No.: US 10,801,923 B2
(45) Date of Patent: Oct. 13, 2020

(54) METHOD AND SYSTEM FOR VEHICLE SUSPENSION SYSTEM

(71) Applicant: Ford Global Technologies, LLC, Dearborn, MI (US)

(72) Inventors: Fakhreddine Landolsi, Canton, MI (US); Imad Makki, Dearborn Heights, MI (US); Dilip Patel, Novi, MI (US); Craig Stephens, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 70 days.

(21) Appl. No.: 15/982,415

(22) Filed: May 17, 2018

(65) Prior Publication Data

US 2019/0353561 A1   Nov. 21, 2019

(51) Int. Cl.
*G01M 17/04* (2006.01)
*B60G 17/018* (2006.01)

(52) U.S. Cl.
CPC ........... *G01M 17/04* (2013.01); *B60G 17/018* (2013.01); *B60G 2400/10* (2013.01); *B60G 2400/204* (2013.01); *B60G 2400/52* (2013.01); *B60G 2500/10* (2013.01); *B60G 2600/0422* (2013.01)

(58) Field of Classification Search
USPC ......................................................... 701/37
See application file for complete search history.

(56) References Cited

U.S. PATENT DOCUMENTS

| | | | |
|---|---|---|---|
| 4,574,267 A | 3/1986 | Jones | |
| 5,218,862 A * | 6/1993 | Hurrell, II | B60C 23/061 340/444 |
| 5,497,657 A * | 3/1996 | Taguchi | B60C 23/061 340/448 |
| 5,553,491 A * | 9/1996 | Naito | B60C 23/061 73/146.5 |
| 6,142,026 A * | 11/2000 | Ohashi | B60C 23/061 701/37 |
| 6,759,952 B2 | 7/2004 | Dunbridge et al. | |
| 7,164,117 B2 * | 1/2007 | Breed | B60R 21/01516 250/208.1 |
| 7,443,288 B2 | 10/2008 | Dunbridge et al. | |
| 7,693,626 B2 * | 4/2010 | Breed | B60C 23/0408 701/34.4 |
| 7,813,850 B2 | 10/2010 | Mannerfelt | |
| 8,096,174 B2 * | 1/2012 | Katou | B60C 23/04 73/146.3 |
| 8,125,171 B2 * | 2/2012 | Rehm | H02H 7/0844 318/400.09 |
| 8,145,376 B2 * | 3/2012 | Sherony | B60W 40/076 701/23 |

(Continued)

OTHER PUBLICATIONS

Google patents translation of Chinese Patent Pub. No. CN1162693C (Oct. 17, 2002). CN1162693C.*

*Primary Examiner* — Jean Paul Cass
(74) *Attorney, Agent, or Firm* — Ray Coppiellie; McCoy Russell LLP

(57) ABSTRACT

Methods and systems are provided for diagnosing a shock absorber coupled to a vehicle tire. In one example, a sensor of a tire pressure measurement system coupled inside a tire is used to measure a tire pressure as well as an oscillatory behavior of the tire. A state of health of a shock absorber coupled to the tire is estimated based on the oscillatory behavior.

16 Claims, 4 Drawing Sheets

(56) References Cited

U.S. PATENT DOCUMENTS

| | | | | |
|---|---|---|---|---|
| 8,160,775 | B2* | 4/2012 | Kitazaki | B60G 17/0164 280/5.52 |
| 8,229,624 | B2* | 7/2012 | Breed | B60R 21/0132 701/36 |
| 8,290,630 | B2* | 10/2012 | Lakomiak | B23Q 17/12 700/275 |
| 8,565,967 | B2* | 10/2013 | Steiner | B60C 23/0459 701/34.4 |
| 8,576,121 | B2* | 11/2013 | Guinart | G01D 5/12 340/572.1 |
| 9,208,622 | B2* | 12/2015 | Ishii | B60W 40/1005 |
| 2002/0010533 | A1* | 1/2002 | Wimmer | G01M 17/04 701/39 |
| 2005/0000278 | A1* | 1/2005 | Haralampu | B60C 23/0425 73/146 |
| 2005/0046584 | A1* | 3/2005 | Breed | B60N 2/0232 340/13.31 |
| 2006/0208169 | A1* | 9/2006 | Breed | G06K 9/00624 250/221 |
| 2006/0267750 | A1* | 11/2006 | Lu | B60C 23/062 340/440 |
| 2007/0228703 | A1* | 10/2007 | Breed | B60R 21/206 280/735 |
| 2008/0039994 | A1* | 2/2008 | Mannerfelt | G01M 17/04 701/33.9 |
| 2008/0147280 | A1* | 6/2008 | Breed | B60N 2/0232 701/46 |
| 2013/0035827 | A1* | 2/2013 | Breed | G01G 19/024 701/45 |
| 2015/0224845 | A1* | 8/2015 | Anderson | B60G 17/052 701/37 |
| 2018/0290501 | A1* | 10/2018 | Oblizajek | G07C 5/0808 |
| 2018/0313725 | A1* | 11/2018 | Harada | G01M 99/002 |

* cited by examiner

METHOD AND SYSTEM FOR VEHICLE SUSPENSION SYSTEM

FIELD

The present description relates generally to methods and systems for diagnosing shock absorbers of a vehicle.

BACKGROUND/SUMMARY

Vehicles are equipped with a suspension system coupled to vehicle wheels, the suspension system including springs and shock absorbers. The springs compensate for uneven road surfaces, such as by absorbing road bumps and vibrations. The shock absorbers are typically mounted inside or alongside each spring and provide resistance to movement of the spring such that vibration and bouncing in spring-suspended parts of the vehicle are reduced. A worn shock absorber has an impaired ability to reduce this vibration and bouncing, which can adversely affect the vehicle's driving characteristics. In addition, operator comfort is reduced.

Shock absorbers may be replaced depending on their age (or mileage over which the shock absorber has been used). Alternatively, a shock absorber may be replaced when an operator notices a significant impairment of vehicle drivability (e.g., elevated vehicle sway, etc.). Further still, shock absorbers may be periodically diagnosed.

One example diagnostic is shown by Mannerfelt in U.S. Pat. No. 7,813,850. Therein, a chassis height sensor is used infer oscillations of a vehicle's air suspended wheel axle when the vehicle is driven on a road. A vehicle controller analyzes the output of the height sensor to determine whether the damping properties of the shock absorbers have deteriorated based on the oscillations of the vehicle's air suspended wheel axle.

The inventors herein have recognized potential issues with such an approach. As one example, the output of the sensor may be affected by vehicle load. For example, the sensor output may be weighted to account for a ratio between mileage and load, which may be a difficult parameter to track when a vehicle carries mixed haulage, for example. In still further examples, the estimation of the shock absorber's health may require varying degrees of calibration. The calibration may factor in the shock absorber geometry, material properties, location, etc. While shock absorbers can also be diagnosed by removing them and testing them, such an approach can also be expensive and labor intensive. If a shock absorber is not diagnosed in a timely manner, vehicle drivability is degraded. In addition, vehicle fuel economy can be degraded due to the additional drag imposed by the worn shock absorber. This in turn affects the driver's experience.

Vehicle wheels may also be configured with a tire pressure measurement system (TPMS) including a sensor coupled to or installed inside a vehicle tire for measuring tire pressure and/or tire temperature. The inventors herein have recognized that the sensor associated with the TPMS can also be used to directly measure acceleration, such as three-dimensional accelerations of the tire. This allows the same sensor to be used as a pressure sensor for tire pressure sensing during some vehicle operating conditions and as an accelerometer for assessing tire oscillations and inferring a shock absorber state of health during other vehicle operating conditions. In addition, the sensed tire pressure can be accounted for when estimating the health of the shock absorber. However, while the acceleration information may be helpful for tracking wheel motion, the inventors have also recognized that because the information is coming from the same source sensor, there may be advantageous ways to combine the sensor information to yield even further improvements.

In one example, shock absorber diagnostics are enabled using a TPMS sensor via a method for a vehicle, comprising: inferring a state of health of a shock absorber coupled to a vehicle tire based on a tire pressure measured by a sensor coupled to the vehicle tire and acceleration measurements from the sensor. In this way, the TPMS sensor may be used for both pressure and acceleration measurements, the pressure and the acceleration measurements enabling the shock absorber state of health to be assessed without calibration concerning shock absorber geometry or material properties.

As one example, each wheel of a vehicle may include a TPMS sensor installed inside a corresponding vehicle tire, each wheel also coupled to a corresponding shock absorber of a vehicle suspension system. In response to a tire pressure measured by the TPMS sensor being less than a threshold, a low tire pressure condition may be indicated so that air may be pumped into the corresponding tire. In response to the tire pressure being above the threshold and further in response to a vehicle speed exceeding a threshold speed, a wheel torque exceeding a threshold torque, and a substantially straight line driving condition, the output of the TPMS sensor may be used to infer a state of health (or remaining effective life) of the associated shock absorber. In particular, the output of the TPMS sensor may be used to determine a measure ($\gamma$) of the oscillatory behavior of the contact acceleration. The measure may be determined as a function of the current tire pressure, as also sensed by the TPMS sensor. As the shock absorber ages, the oscillatory behavior increases. Thus, based on a change in the oscillatory behavior, degradation of the shock absorber may be indicated. In another example, when degradation is not indicated, a remaining useful life of the shock absorber may be estimated. Since there are generally four shock absorbers (and four TPMS sensors) in a vehicle, this approach enables a vehicle controller to assess each absorber without requiring extensive calibration as to the material, configuration, or location of each absorber.

In this way, each shock absorber of a vehicle can be diagnosed using TPMS sensors. By relying on existing sensors, cost and complexity reduction benefits are achieved. The technical effect of using a tire pressure sensor to infer both the tire pressure and the oscillatory behavior of the tire is that the effect of the tire pressure on the oscillatory behavior can be more accurately accounted for. As such, this increases the accuracy of the shock absorber state of health estimation. In addition, the state of health can be learned without requiring any specific knowledge of shock absorber geometry and material properties. This simplifies the implementation of the diagnostic. By learning the remaining useful life of the shock absorber, the shock absorber may be replaced in a timely manner, increasing vehicle performance and fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
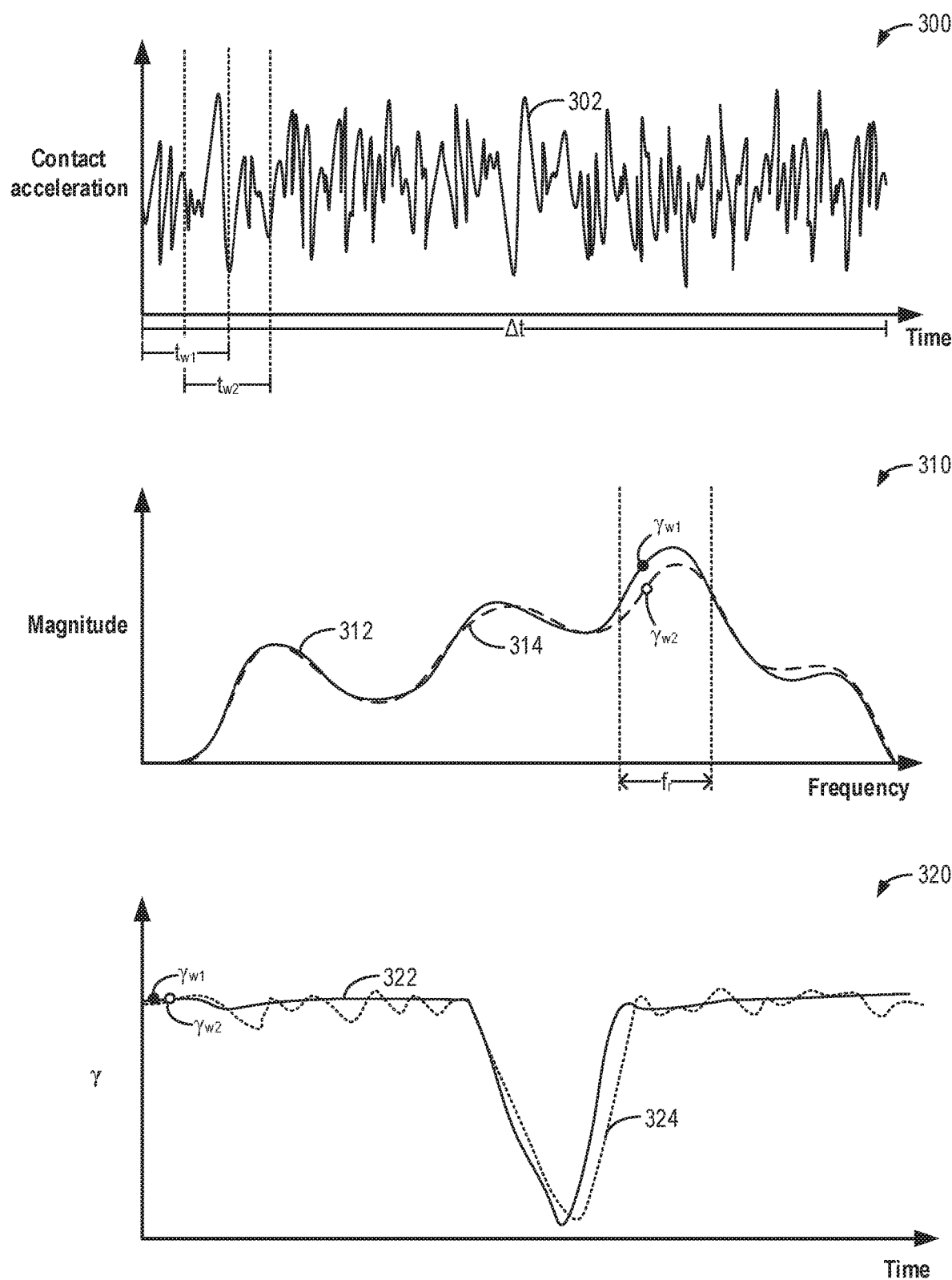
FIG. 3 shows a set of graphs illustrating how an oscillatory behavior of a tire may be determined using measurement from a TPMS sensor.
Figure 4:
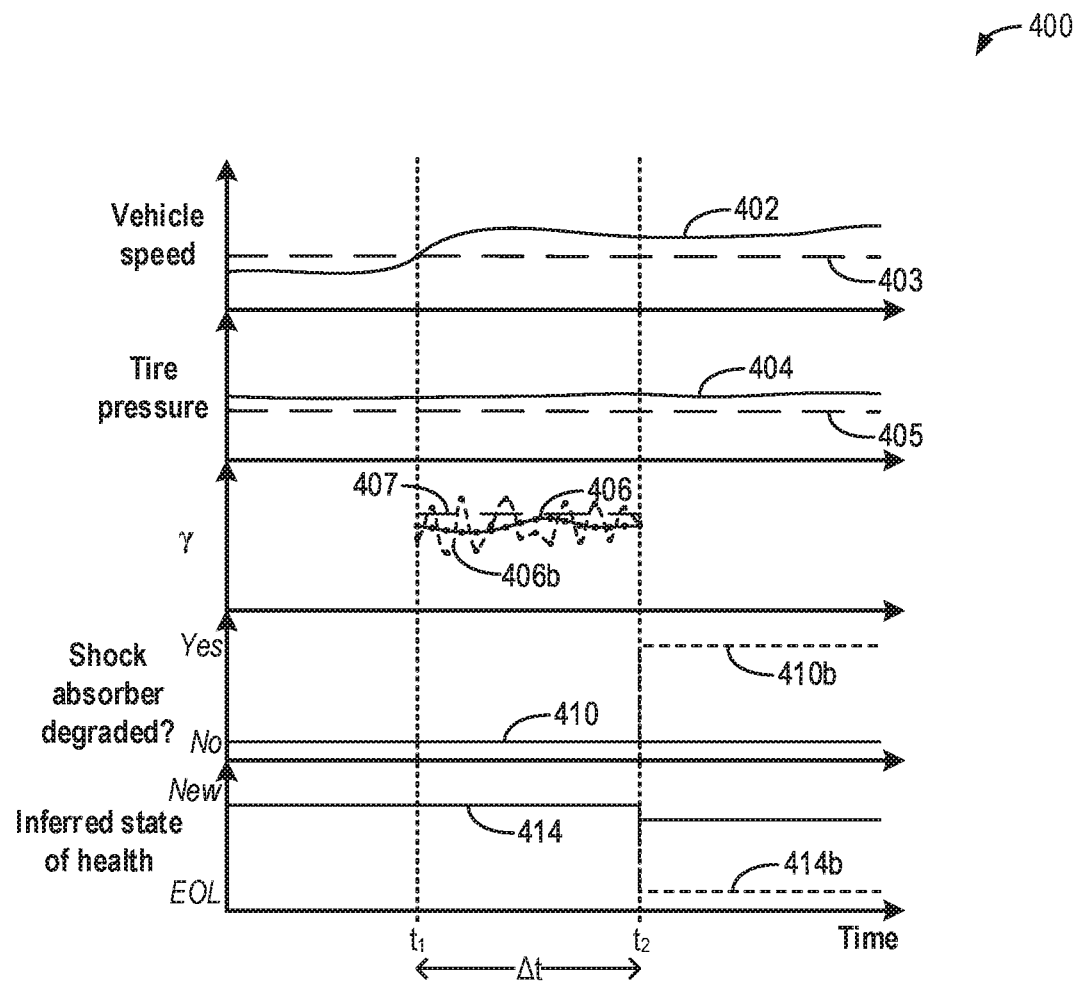
FIG. 4 shows a prophetic example timeline of a tire pressure sensing and shock absorber diagnostic via a vehicle TPMS sensor.

The following detailed description relates to systems and methods for inferring a state of health of a shock absorber of a vehicle suspension system. The systems and methods may be applied to a vehicle system that includes a tire pressure monitoring system (TPMS), such as the hybrid vehicle system depicted in FIG. 1. While a hybrid vehicle is presented, it should be understood that the hybrid vehicle system represents an example vehicle system, and the systems and methods described herein may be applied to any vehicle system including a TPMS. A vehicle controller may be configured to perform a control routine, such as the example routine of FIG. 2, to use a sensor of the TPMS to estimate an oscillatory behavior of the tire to which it is coupled and infer the state of health of the corresponding shock absorber accordingly. FIG. 3 shows how an output of the TPMS sensor may be used to estimate the oscillatory behavior of the tire. An example timeline for inferring the state of health of a shock absorber based on the TPMS sensor output is depicted in FIG. 4.

Figure 1:
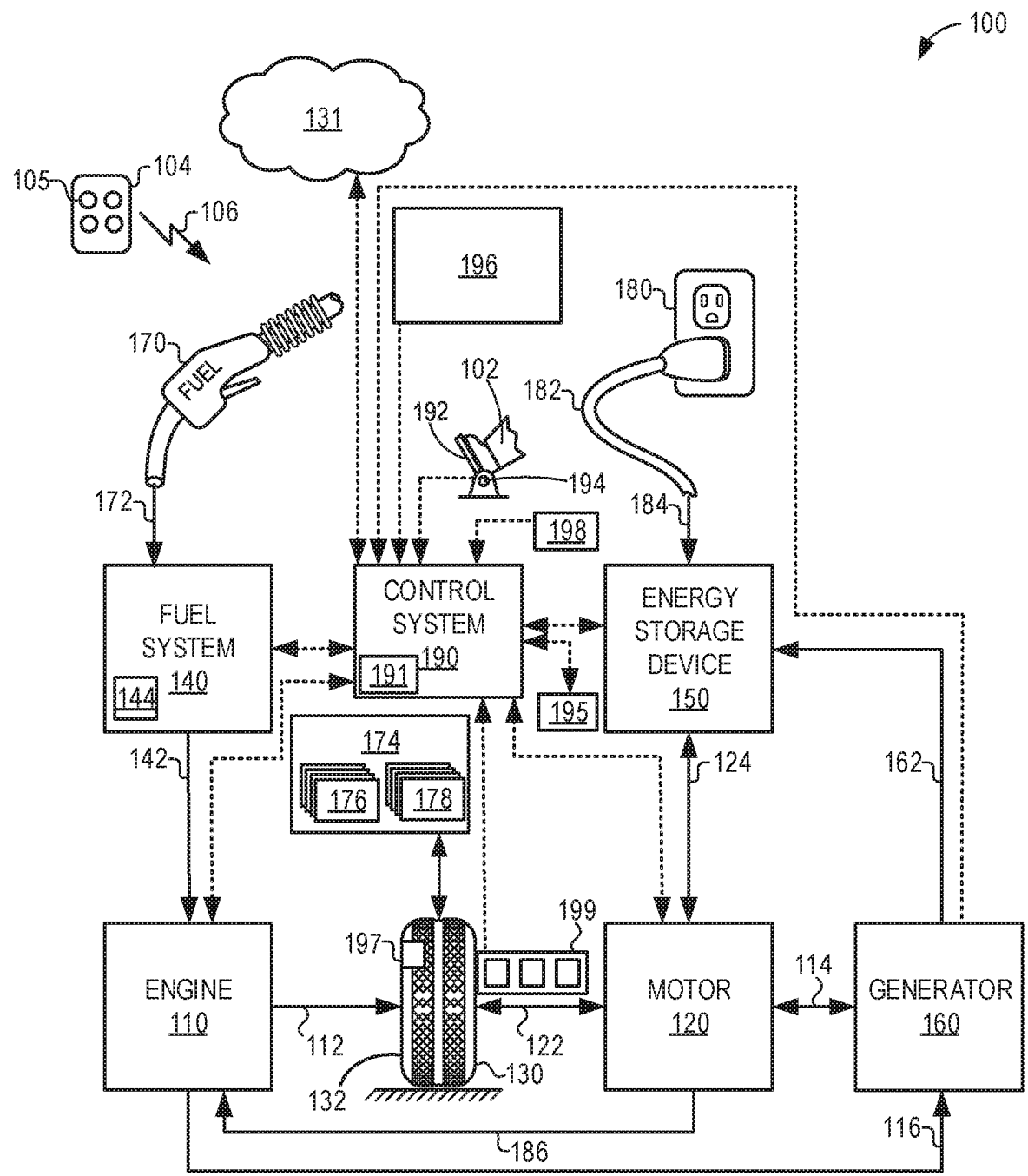
FIG. 1 shows a schematic diagram of an example vehicle propulsion system including an associated tire pressure measurement system (TPMS).

Turning now to the figures, FIG. 1 illustrates an example vehicle system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV). However, it should be understood that, although FIG. 1 shows a hybrid electric vehicle system, in other examples, vehicle system 100 may not be a hybrid electric vehicle system and may be propelled solely via engine 110.

Vehicle system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued and the engine is at rest. For example, under select operating conditions, motor 120 may propel the vehicle via a drive wheel 130, as indicated by an arrow 122, while engine 110 is deactivated.

During other operating conditions, engine 110 may be set to a deactivated state (as described above) while motor 120 may be operated to charge an energy storage device 150. For example, motor 120 may receive wheel torque from drive wheel 130, as indicated by arrow 122, and may convert the kinetic energy of the vehicle to electrical energy for storage at energy storage device 150, as indicated by an arrow 124. This operation may be referred to as regenerative braking of the vehicle. Thus, motor 120 may function as a generator in some examples. However, in other examples, a generator 160 may instead receive wheel torque from drive wheel 130 and may convert the kinetic energy of the vehicle to electrical energy for storage at energy storage device 150, as indicated by an arrow 162. As an additional example, motor 120 may use energy stored at energy storage device 150 to crank engine 110 in a starting operation, as indicated by an arrow 186. Energy storage device may include one or more batteries. For example, energy storage device may include one or more traction batteries and/or one or more starting, lighting, and ignition (SLI) batteries.

During still other operating conditions, engine 110 may be operated by combusting fuel received from a fuel system 140, as indicated by an arrow 142. For example, engine 110 may be operated to propel the vehicle via drive wheel 130, as indicated by an arrow 112, while motor 120 is deactivated. During other operating conditions, both engine 110 and motor 120 may each be operated to propel the vehicle via drive wheel 130, as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle system 100 may be configured as a series type vehicle propulsion system, whereby the engine does not directly propel the drive wheels. Rather, engine 110 may be operated to power motor 120, which may in turn propel the vehicle via drive wheel 130, as indicated by arrow 122. For example, during select operating conditions, engine 110 may drive generator 160, as indicated by an arrow 116, which may in turn supply electrical energy to one or more of motor 120, as indicated by an arrow 114, or energy storage device 150, as indicated by arrow 162. As another example, engine 110 may be operated to drive motor 120, which may in turn function as a generator to convert the engine output to electrical energy. The electrical energy may be stored at energy storage device 150 for later use by the motor, for example.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may include one or more controllers. Each of the one or more controllers may include a microprocessor unit, input/output ports, an electronic storage medium for executable programs (e.g., executable instructions) and calibration values, such as a non-transitory read-only memory (ROM) chip, random access memory (RAM), keep alive memory (KAM), and a data bus. Controllers included in control system 190 may communicate with each other over a controller area network.

Control system 190 may receive an indication of an operator requested output of the vehicle propulsion system from a vehicle operator 102. For example, control system 190 may receive sensory feedback from pedal position sensor 194, which communicates with a pedal 192. Pedal 192 may refer schematically to a brake pedal and/or an accelerator pedal. Furthermore, in some examples, control system 190 may be in communication with a remote engine start receiver 195 (or transceiver) that receives wireless signals 106 from a key fob 104 having a remote start button 105. In other examples (not shown), a remote engine start may be initiated via a cellular telephone or a smartphone-based system where a user's telephone sends data to a server and the server communicates with the vehicle to start the engine.

In the case of an autonomous vehicle (AV), vehicle operator 102 may be substituted prior to the start of or en route during a specified trip by an autonomous vehicle controller 191 included control system 190. AV controller 191 may provide indications and/or requested output of vehicle system 100 to control system 190. Control system 190, in accordance with the requests from AV controller 191, may then actuate various vehicle actuators to propel the vehicle. In the case of an AV, vehicle system 100 may include various devices for detecting vehicle surroundings, such as radar, laser light, global positioning system (GPS), odometry, and computer vision sensors. Advanced control systems, as part of AV controller 191, may interpret sensory information to identify appropriate navigation paths as well as obstacles and relevant signage (e.g., speed limits, traffic signals, and the like). AV controller 191 may further include executable instructions that are capable of analyzing the sensory data to distinguish between different vehicles on the road, which may aid in planning a path to a desired destination, as well as executable instructions to, in combination with sensory feedback, park a vehicle in a designated or detected available parking space. For example, AV controller 191 may include executable instructions to detect a type of roadway (e.g., a one-way street, a freeway, a divided highway, and the like) or an available parking space (e.g., an empty space with enough clearance for the vehicle that is not prohibited based on time of day or loading zone, and the like). Thus, in some examples, vehicle 5 may be controlled using input from vehicle operator 102, and in other examples, vehicle system 100 may be controlled using executable instructions included in AV controller 191 and without input from vehicle operator 102, such as when vehicle operator 102 is not present.

Energy storage device 150 may periodically receive electrical energy from a power source 180 residing external to the vehicle (e.g. not part of the vehicle), as indicated by an arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198 and a roll stability control sensor, such as a lateral and/or longitudinal and/or yaw rate sensor(s) 199. The vehicle instrument panel 196 may include indicator light(s) and/or a text-based display in which messages are displayed to the operator. The vehicle instrument panel 196 may also include various input portions for receiving an operator input, such as buttons, touch screens, voice input/recognition, etc. In an alternative example, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Vehicle system 100 may further include a tire pressure measurement system (TPMS), including a TPMS sensor 197 coupled to a tire 132 of wheel 130. TPMS sensor 197 may include one or more sensors and may provide direct measurements of tire pressure, tire temperature, and tire accelerations, such as three-directional accelerations. For example, TPMS sensor 197 may include one or more one- or two-axis accelerometers. As an example, an output of TPMS sensor 197 may be used to indicate that the air pressure inside the associated tire 132 is above a threshold, such as a non-zero air pressure threshold rating of the tire corresponding to nominal tire inflation, as specified by a tire manufacturer. An additional output of TPMS sensor 197 may be used to indicate a tire temperature.

In the depicted example, TPMS sensor 197 is coupled inside tire 132 as a tire-mounted sensor (TMS). The tire-mounted location, such as coupled to an inner liner of the tire, offers increased coupling of the sensor with road contact properties. For example, the TMS enables a footprint of tire 132 to be characterized, which further enables characterization of a contact patch between the tire and the road. In other examples, TPMS sensor 197 may be coupled to a valve stem of tire 132 instead of the inner liner of tire 132. In still other examples, TPMS sensor 197 may be directly mounted to a rim of wheel 130 with a metal strap or other attachment means. In each location, TPMS sensor 197 may be configured as a direct TPMS sensor as it directly mounted to tire 132, either internally or externally, and provides direct pressure, temperature, and acceleration measurements. Furthermore, TPMS sensor 197 may be a wireless sensor that communicates with control system 190 via radio frequency technology. In other examples, mechanical, electrical, and/or magnetic methods may additionally or alternatively be used to communicate with control system 190. It should be understood that each wheel 130 of vehicle system 100 may include a separate TPMS sensor 197 coupled thereto.

Vehicle system 100 further includes a suspension system 174. Suspension system 174 includes a spring suspension unit 176 and a shock absorber unit 178 (also referred to as a shock absorber herein) coupled to each wheel 130. The shock absorber unit 178 may be mounted inside or alongside the spring suspension unit 176 at each corner of the vehicle. The shock absorber unit 178 provides resistance to the movement of springs within spring suspension unit 176, thereby damping oscillations of the parts of the vehicle that are spring suspended (herein a wheel axle). In doing so, shock absorber unit 178 converts the potential/kinetic energy of the spring into heat and reduces stresses on the vehicle. For example, the conversion of energy keeps the vehicle's body from bouncing more than once or twice, providing a controlled ride, and helps the keep the wheels 130 in contact with the ground. A worn shock absorber has an impaired ability to damp the oscillations (e.g., an ability to dissipate bump-stored energy in the springs is reduced), leading to additional bouncing and a less controlled ride. As described in more detail below, under select conditions, such as when the tire pressure is greater than the threshold, TPMS sensor 197 can also be used to diagnose a state of health of shock absorber units 178. In particular, a change in the oscillatory behavior of a shock absorber coupled to a given tire may be inferred from accelerations measured by TPMS sensor 197. An increase in the oscillatory behavior is then correlated with a decrease in the state of health of the shock absorber, which may be used to determine when the shock absorber is degraded (e.g., diagnostics) or to estimate a remaining life of the shock absorber (e.g., prognostics).

Furthermore, in some examples, suspension system 174 may be an active suspension system. In such examples, suspension system 174 may include hydraulic and/or electronic actuators to actively control a vertical movement of a vehicle body (e.g., chassis) relative to wheel 130. In some examples, the vertical movement (e.g., height) may be controlled independently at each wheel 130 of vehicle system 100. For examples, the actuators of suspension system 174 may raise or lower the chassis at each wheel 130 responsive to a control signal from control system 190, as further described with respect to FIG. 2.

Control system 190 may be communicatively coupled to other vehicles or infrastructures using appropriate communications technologies. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technologies. Information exchanged between vehicles can be either directly communicated between vehicles or can be multi-hop. In some examples, longer range communications (e.g., WiMax) may be used in place of or in conjunction with V2V or V2I2V to extend the coverage area by a few miles. In still other examples, vehicle control system 190 may be communicatively coupled to other vehicles or infrastructures via wireless network 131 and the Internet (e.g., the Cloud).

Control system 190 receives information from the plurality of sensors of the vehicle system (various examples of which are described herein) and sends control signals to a plurality of actuators (various examples of which are described herein). As one example, the sensors may include pedal position sensor 194 and TPMS sensor 197. Other sensors, such as pressure, temperature, air/fuel ratio, and composition sensors may be coupled to various locations in the vehicle system 100. As another example, the actuators may include a fuel injector, an engine intake throttle, etc. The control system 190 may include a controller that receives input data from the various sensors, processes the input data, and triggers the actuators in response to the processed input data based on instruction or code programmed therein corresponding to one or more routines. An example control routine is described herein with regard to FIG. 2. In one example, based on input from TPMS sensor 197 of a given tire 132, the controller may infer a remaining life of a shock absorber 178 coupled to the given tire. The controller may then indicate to an operator, such as via instrument panel 196, an indication that the shock absorber needs to be replaced.

Figure 2:
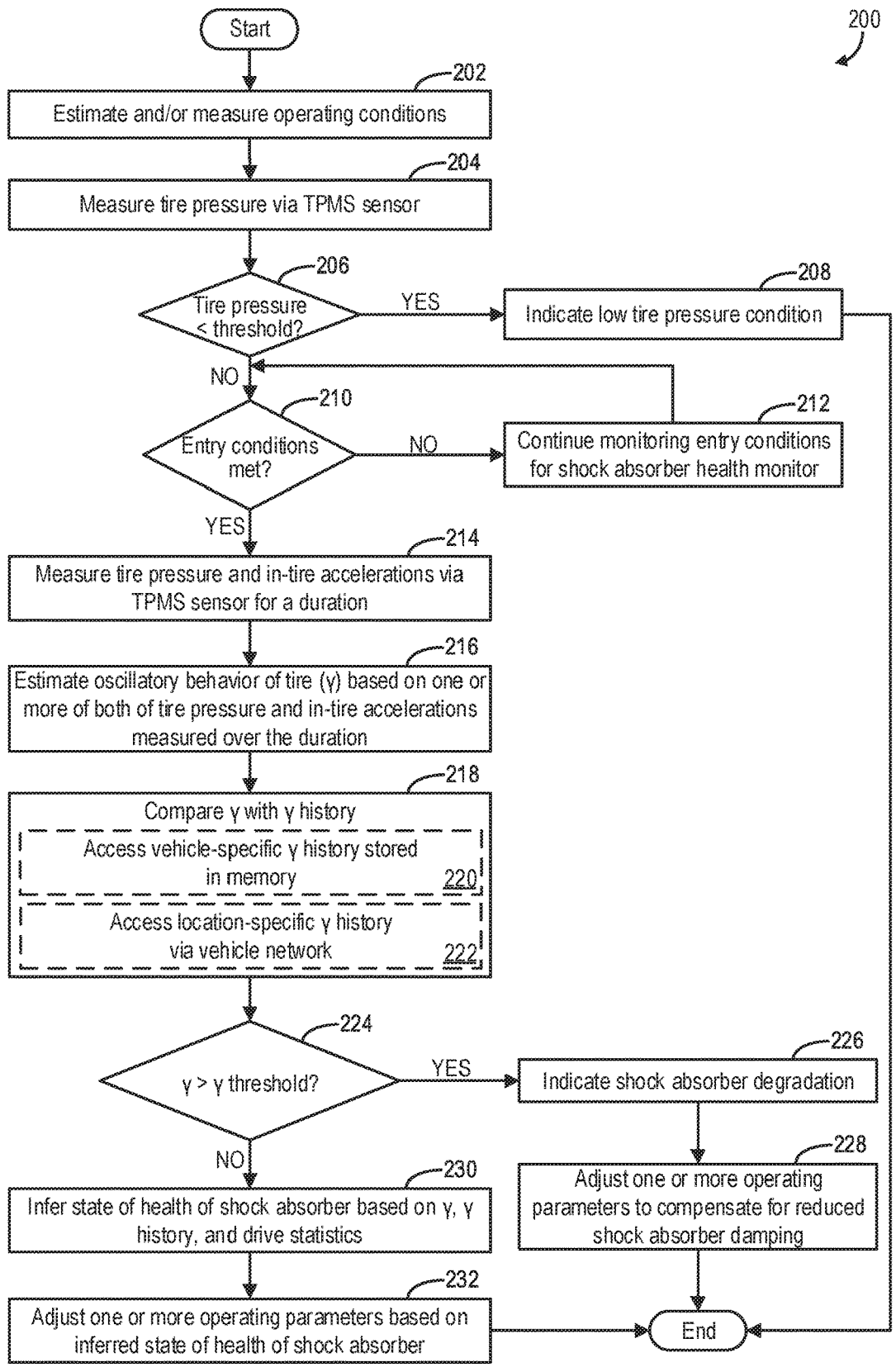
FIG. 2 shows a high level flow chart of an example method for using TPMS sensors for a shock absorber health monitor.

Turning now to FIG. 2, an example method 200 is described for a health monitor of each of a vehicle tire and an associated shock absorber (e.g., shock absorber unit 178 of FIG. 1) based on measurements from a TPMS sensor coupled to the vehicle tire (e.g., TPMS sensor 197 of FIG. 1). The method enables a common sensor to be leveraged for both diagnostics and shock absorber prognostics (e.g., a remaining life of the shock absorber). Instructions for carrying out method 200 and the rest of the methods included herein may be executed by a controller (e.g., a controller included in control system 190 of FIG. 1) based on instructions stored on a memory of the controller and in conjunction with signals received from sensors of the engine system, such as the sensors described above with reference to FIG. 1. The controller may employ engine actuators of the engine system to adjust engine operation according to the methods described below. Furthermore, the controller may perform method 200 for each vehicle tire and associated shock absorber based on output from the corresponding TPMS sensor.

Method 200 begins at 202 and includes estimating and/or measuring vehicle operating conditions. These include, for example, vehicle speed, driver torque demand, driver brake demand, ambient conditions (e.g., ambient temperature, pressure, and humidity), and a state of charge (SOC) of a system battery. Vehicle operating conditions may also include engine operating conditions, such as engine speed, manifold air flow and air pressure, exhaust gas recirculation flow, boost pressure, etc.

At 204, the method includes measuring a tire pressure via the TPMS sensor. For example, as elaborated below, TPMS sensors may be coupled inside each vehicle tire and may be used to provide an indication of the tire pressure in the corresponding tires to a vehicle operator so that the vehicle operator may be alerted if pressure in one or more tires becomes too low. As another example, the controller may take into account the tire pressure in monitoring the health of the shock absorber, as also elaborated below.

At 206, the method includes determining if the measured tire pressure is less than a non-zero threshold. In one example, the threshold is based on a pressure setting of the given tire. The pressure setting may be set by a tire manufacturer based on the size of the tire as well as its intended use (which may vary with the nature of the vehicle in which it is mounted). Tire pressures at or above the threshold correspond to tire inflation pressures that enable optimum tire and vehicle performance, including increased vehicle control, reduced tire wear, and increased vehicle fuel economy. Tire pressure below the threshold correspond to tire inflation pressures that result in suboptimum tire and vehicle performance, including decreased vehicle control, increased tire wear, and decreased vehicle fuel economy. Furthermore, comparing the tire pressure to the threshold serves as an entry condition for monitoring the health of the associated shock absorber, as underinflated tires may confound data gathered during the monitor.

If the measured tire pressure is below the threshold, method 200 proceeds to 208 and includes indicating a low tire pressure condition. For example, an indication may be sent to a display device in the vehicle (e.g., instrument panel 196) to alert the vehicle operator that the pressure of the tire is low and prompting the vehicle operator to refill the appropriate tire. The associated shock absorber may not be assessed for diagnostics and prognostics. Following 208, method 200 ends.

If the measured tire pressure is not below the threshold (e.g., the measured tire pressure is greater than or equal to the threshold), method 200 proceeds to 210 and includes determining if entry conditions for the shock absorber health monitor are met. For example, entry conditions for the shock absorber diagnostic conditions may be met if wheel torque (e.g., of wheel 130) is higher than a threshold, vehicle speed is higher than a threshold speed, and the vehicle is in a straight line drive. For example, the straight line drive may minimize a contribution of the road over which the vehicle is driven to vehicle bouncing in order to more accurately determine a damping ability of the shock absorber. At vehicle speeds above the threshold speed, the tires may be sufficiently warm (e.g., in a steady state condition) such that tire state may not fluctuate throughout the shock absorber health monitor. In one example, entry conditions may not be met if the vehicle is stationary, slowed down (such as for a parking maneuver), or during turning maneuvers. If shock absorber diagnostic conditions are not met, method 200 proceeds to 212 and includes continuing to monitor the entry conditions for the shock absorber health monitor. For example, the controller may wait for the entry conditions to be met in order to perform the shock absorber health monitor. In this way, the shock absorber health monitor may be performed as often as possible without false positives. In the present case, isolating the effect of road noise is particularly beneficial for increasing an accuracy of the monitor.

If the entry conditions are met, method 200 proceeds to 214 and includes measuring the tire pressure and in-tire accelerations via the TPMS sensor for a duration. For example, the tire pressure may be re-measured in order to confirm that the tire pressure remains at or above the threshold in order to trigger activation of one or more accelerometers of the TPMS sensor. Prior to 214, in some examples, the one or more accelerometers may remain deactivated in order to conserve TPMS sensor battery power, particularly due to due to a high sampling frequency of the acceleration measurements. The duration corresponds to a pre-calibrated, non-zero time interval over which the tire pressure and the in-tire accelerations are recorded at the high sampling frequency (e.g., 2 GHz). As a non-limiting example, the duration may be in a range of 1 to 3 seconds.

At 216, method 200 includes estimating oscillatory behavior of the tire ($\gamma$) based on one or more or both of the tire pressure and the in-tire accelerations measured over the duration. In particular, the in-tire accelerations (e.g., contact acceleration) acquired over the duration may be transformed into a frequency domain, and the tire pressure measured over the duration may be used to adjust a frequency range of interest. In one example, the controller may employ near real-time data processing such that processing of the tire pressure and in-tire acceleration data begins before the duration has elapsed and data acquisition is complete.

Turning briefly to FIG. 3, a set of graphs illustrating how $\gamma$ may be derived from one or more or both of the tire pressure and in-tire accelerations measured by the TPMS sensor over the duration is shown. A first graph 300 shows a contact acceleration signal recorded over time (plot 302). The horizontal axis of first graph 300 represents time, with time increasing along the horizontal axis from left to right, and the vertical axis represents the contact acceleration, with a value of the contact acceleration increasing along the vertical axis from bottom to top. A second graph 310 shows a frequency transform of the contact acceleration signal. The horizontal axis of second graph 310 represents frequency, with the frequency increasing along the horizontal axis from left to right, and the vertical axis represents magnitude, with magnitude increasing along the vertical axis from bottom to top. A third graph 320 shows $\gamma$ values plotted over time for a nominal shock absorber (plot 322) and a degraded shock absorber (dashed plot 324). The horizontal axis of third graph 320 represents time, with time increasing along the horizontal axis from left to right, and the vertical axis represents $\gamma$, with $\gamma$ values increasing along the vertical axis from bottom to top.

As shown in first graph 300, the contact acceleration signal (plot 302) from the one or more accelerometers of the TPMS sensor is recorded over the duration ($\Delta t$). The contact acceleration signal comprises a sum of a plurality of sinusoidal oscillations having distinct frequencies, amplitudes, and phases. To divide the contact acceleration signal (plot 302) into its frequency components, the contact acceleration signal obtained over the duration may be divided into a plurality of smaller time windows ($t_w$), and the signal obtained during each time window may be transformed into the frequency domain. The time window is a fraction of the duration and moves along the time axis in an overlapping or a non-overlapping fashion such that the contact acceleration signal obtained over the entire duration is represented. A first time window ($t_{w1}$) and a second time window ($t_{w2}$) are shown in the example of first graph 300, and it should be understood that additional time windows are distributed throughout the duration although not explicitly illustrated. The contact acceleration signal obtained within each time window may be transformed into the frequency domain via a fast Fourier transform, for example.

The frequency-transformed contact acceleration signal is shown in graph 310, with plot 312 showing the frequency-transformed contact acceleration signal from the first time window and dashed plot 314 showing the frequency-transformed contact acceleration signal from the second time window. The controller may determine a frequency range ($f_r$) to analyze to determine $\gamma$. The frequency range may correspond to an unsprung mass resonance frequency of a vehicle. As an example, the frequency range may include relatively high frequencies. In one non-limiting example, the frequency range may be 2 to 3 GHz. In some examples, the controller may further adjust the frequency range based on an average of the tire pressure measured over the duration and/or the vehicle speed over the duration. As one example, when the tire pressure measured over the duration is higher, the frequency range may be shifted to higher frequencies and/or expanded to include more frequencies. As another example, when the tire pressure measured over the duration is lower, the frequency range may be shifted to lower frequencies and/or narrowed to include fewer frequencies. As another example, when the vehicle speed measured over the duration is higher, the frequency range may be shifted to higher frequencies, and when the vehicle speed is lower, the frequency range may be shifted to lower frequencies. It should be understood that in both examples, the tire pressure is greater than or equal to the threshold (e.g., as determined at 206 of method 200).

A value of $\gamma$ may be determined for each of the frequency-transformed signals (e.g., the frequency-transformed signal from each time window) as an average magnitude of the frequency within the frequency range. Second graph 310 shows a first $\gamma$ value, $\gamma_{w1}$ (closed circle), for the frequency-transformed contact acceleration signal from the first time window (plot 312) and a second $\gamma$ value, $\gamma_{w2}$ (open circle), for the frequency-transformed contact acceleration signal from the second time window (dashed plot 314). Each of the $\gamma$ values may be plotted over time, as shown in third graph 320. In some examples, the $\gamma$ values determine for each time window may serve as data points for constructing a continuous curve, such as shown in plot 322. Furthermore, in some examples, the plot of the $\gamma$ values over time may be used in machine learning to identify patterns of $\gamma$ that denote a nominal shock absorber (plot 322) as well as patterns of $\gamma$ that denote a degraded shock absorber (dashed plot 324), as further described below. Further still, a change in the $\gamma$ pattern over time may be used for shock absorber prognostics, such as to infer a remaining useful life of the shock absorber (e.g., before the shock absorber becomes degraded). The controller may store the plot of $\gamma$ over time in non-transitory memory, which may be accessed at a later time as a part of a $\gamma$ history of the vehicle. Note that in third graph 320, the large dip in both plot 322 and dashed plot 324 corresponds to the TPMS sensor being in the contact patch between the tire and the road, which may occur once per tire revolution. In some examples, the controller may exclude this portion of the $\gamma$ plot when determining the state of health of the associated shock absorber.

Returning to FIG. 2, at 218, method 200 includes comparing the estimated oscillatory behavior of the tire with an estimated oscillatory behavior history ($\gamma$ history). Comparing the estimated oscillatory behavior acquired over the duration with the $\gamma$ history may include accessing a vehicle-specific $\gamma$ history stored in a memory of the controller, as indicated at 220. In some examples, the vehicle-specific $\gamma$ history may include the $\gamma$ patterns obtained for every tire (and therefore, every shock absorber) of the vehicle. In other examples, the vehicle-specific $\gamma$ history may include the $\gamma$ patterns obtained for the tire corresponding to the specific shock absorber being assessed. In still other examples, the vehicle-specific $\gamma$ history may include the $\gamma$ patterns obtained for a subset of the vehicle tires, with the subset determined based on the location of the shock absorber being assessed. For example, when a shock absorber corresponding to a rear tire is being assessed, $\gamma$ patterns obtained for rear tires (and not front tires) may be used, as the oscillatory behavior may vary based on the location of the tire.

Comparing the estimated oscillatory behavior with the $\gamma$ history may additionally or alternatively include accessing a location-specific $\gamma$ history via a vehicle network, such as a V2V or a V2X network. The location-specific $\gamma$ history may include $\gamma$ patterns recorded by a plurality of vehicles while traveling in the current vehicle location. For example, the $\gamma$ plots for each of the plurality of vehicles may be geotagged and uploaded to a wireless network (e.g., wireless network 131 of FIG. 1), which may then be downloaded by the controller to compare with the current estimated oscillatory behavior. In particular, the location-specific $\gamma$ history may enable the controller to isolate location-specific noise factors, such as oscillations due to a condition of the road, when used separately or in combination with the vehicle-specific $\gamma$ history.

At 224, method 200 includes determining if $\gamma$ is greater than a $\gamma$ threshold. The $\gamma$ threshold refers to a calibratable, non-zero threshold value. As an example, the $\gamma$ threshold may be determined based on the $\gamma$ history. For example, the controller may input $\gamma$ values from the $\gamma$ history into an algorithm and output the corresponding $\gamma$ threshold. As another example, the $\gamma$ threshold may be a pre-determined value stored in a memory of the controller that is further calibrated based on the $\gamma$ history. Values greater than the $\gamma$ threshold denote increases in the oscillatory behavior of the contact acceleration measured by the TPMS sensor, indicative of tire vibrations and bouncing due to a worn shock absorber. Values less than or equal to the $\gamma$ threshold denote nominal vibration/bouncing damping by the shock absorber. Additionally or alternatively, the $\gamma$ pattern (e.g., the plot of $\gamma$ over time) may be analyzed to detect outliers, such as by determining if the $\gamma$ pattern is consistent with the $\gamma$ history (e.g., via pattern matching). As an example, frequent fluctuations in $\gamma$ may denote a worn shock absorber, as shown in dashed plot 324 of FIG. 3, whereas $\gamma$ may remain relatively stable or change gradually over time for a nominal shock absorber, as shown in plot 322 of FIG. 3.

If $\gamma$ is greater than the $\gamma$ threshold (or if the $\gamma$ pattern is inconsistent with the $\gamma$ history), method 200 proceeds to 226 and includes indicating shock absorber degradation. Indicating shock absorber degradation may include storing a corresponding diagnostic trouble code (DTC) in the memory of the controller. The DTC may remain until the corresponding shock absorber is replaced. Indicating shock absorber degradation may further include alerting the vehicle operator of the degradation via the display device so that the vehicle operator may be prompted to service the vehicle.

At 228, method 200 includes adjusting one or more operating parameters to compensate for reduced shock absorber damping. As an example, if the vehicle includes an active suspension system, a height of the suspension may be increased. For example, the controller may send a control system to each actuator of the active suspension system (e.g., suspension system 174 of FIG. 1) to vertically raise a chassis of the vehicle in response to the indication of shock absorber degradation. As another example, engine torque and/or vehicle speed may be limited, such as maintained below corresponding thresholds, to reduce bumps and vibrations felt by the vehicle operator and any other occupants while maintaining vehicle drivability. In further examples, such as when the vehicle is an autonomous vehicle, the controller may also limit or curtail autonomous functions of the vehicle, such as by restricting an amount of driving time and/or a driving distance. Following 228, method 200 ends.

Returning to 224, if $\gamma$ is not greater than the $\gamma$ threshold (or if the $\gamma$ pattern is consistent with the $\gamma$ history), method 200 proceeds to 230 and includes inferring the state of health of the shock absorber based on the estimated oscillatory behavior, the $\gamma$ history, and drive statistics of the vehicle. With shock absorber degradation not indicated (e.g., the shock absorber is functioning nominally), the controller may estimate a remaining useful life (in time or distance of travel) of the shock absorber before degradation is expected to occur by taking into account the current estimated oscillatory behavior, the $\gamma$ history, and the drive statistics of the vehicle. As an example, the state of health of the shock absorber may be estimated by comparing the current oscillatory behavior with the vehicle-specific oscillatory behavior history to assess how the damping ability of the shock absorber has changed over the life of the shock absorber. The controller may further reference drive statistics to determine a number of operational hours the shock absorber has been used, an average vehicle speed, an average vehicle load, etc. The controller may use these values to determine an end of life (EOL) estimate that can be easily understood by the vehicle operator, such as a remaining time of vehicle operation or distance of travel before shock absorber degradation is expected (e.g., when the shock absorber is too worn to dampen vehicle bouncing). The remaining time or distance may then be conveyed to the vehicle operator, such as via the instrument panel.

In one example, the controller may use an algorithm to convert the state of health into an estimate of time/distance remaining before shock absorber degradation occurs. For example, the controller may convert the inferred state of health into a remaining time or duration estimate for display to the vehicle operator based on the drive statistics and predicted future driving. For example, it may be displayed that "the left rear shock absorber will need to be replaced in 120 miles." Such a message may provide the vehicle operator with a more comprehensible estimate of when to service the vehicle for shock absorber replacement. In addition, the displayed estimate may prompt the vehicle operator to adjust their driving pattern, such as to drive less aggressively.

At 232, method 200 includes adjusting one or more operating parameters based on the inferred state of health of the shock absorber. As one example, responsive to the remaining life being lower than a threshold, a warning may be displayed to the vehicle operator informing on the need to replace the shock absorber and the deteriorated performance that will affect the chassis and the driver experience if the shock absorber is not replaced before the EOL is reached. In further examples, such as when the vehicle is an autonomous vehicle, the controller may also limit or curtail autonomous functions of the vehicle based on the predicted EOL of the shock absorber. For example, autonomous operation limitation may come into effect if the predicted EOL of the shock absorber is predicted to be within a predefined amount of time such that the vehicle is not in operation when the predicted EOL of the shock absorber occurs.

In this way, the output of a TPMS sensor may be used to detect a pressure condition of the tire (e.g., whether the tire is in a low pressure condition) as well as a condition of a shock absorber coupled to the tire. The detected condition may include an inferred state of health, which may be used to determine when the shock absorber is expected to become degraded. Furthermore, degradation of the shock absorber may be detected based on the output of the TPMS sensor. By using pressures and contact accelerations measured by the TPMS sensor to determine changes in the oscillatory behavior of the tire for shock absorber prognosis and diagnosis, the shock absorber may be assessed without any specific knowledge about the shock absorber geometries or material properties, making the assessment easy to implement and calibrate. Furthermore, by comparing the changes in the oscillatory behavior of the tire to past oscillatory behaviors (e.g., via machine learning algorithms) as well as location-specific oscillatory behaviors, noise factors, such as due to rough roads, may be isolated, increasing an accuracy of the prognosis and diagnosis.

Turning now to FIG. 4, an example timeline 400 is shown for using a TPMS sensor for measuring tire pressure and for inferring the state of health of a shock absorber coupled to the same tire, such as according to the example method of FIG. 2. The method not only enables the tire and the shock absorber to be diagnosed using the same sensor, but also enables the shock absorber health to be assessed in view of a history of the shock absorber health for increased accuracy. Vehicle speed is shown in plot 402, tire pressure is shown in plot 404, an oscillatory behavior of the tire ($\gamma$) is shown in plot 406, an indication of shock absorber degradation is shown in plot 410, and inferred state of health of the shock absorber is shown in plot 414. For all of the above, the horizontal axis represents time, with time increasing along the horizontal axis from left to right. The vertical axis represents each labeled parameter. For plots 402, 404, and 406, a value of the labeled parameter increases along the vertical axis from bottom to top. For plot 410, the vertical axis represents whether shock absorber degradation is indicated ("yes" or "no"). For plot 414, the vertical axis shows the inferred state of health of the shock absorber ranging from "new" (e.g., denoting a newly installed shock absorber) and "EOL" (e.g., the end of life of the shock absorber).

Prior to time t1, the tire pressure (plot 404) is estimated via the TPMS sensor (e.g., TPMS sensor 197 of FIG. 1). Although a continuous curve is shown, note that discrete tire pressure measurements may be taken at a desired interval. The tire pressure (plot 404) is greater than a threshold tire pressure (dashed line 405), indicating that a low tire pressure condition is not present. As such, the health of the corresponding shock absorber may be assessed responsive to entry conditions being met. However, prior to time t1, the vehicle is operating at a vehicle speed (plot 402) that is less than a threshold vehicle speed (dashed line 403). Therefore, the shock absorber health monitor is not performed.

At time t1, the vehicle speed (plot 402) surpasses the threshold vehicle speed (dashed line 403) and the tire pressure (plot 404) remains above the threshold tire pressure (dashed line 405). In response, an accelerometer of the TPMS sensor is activated and outputs in-tire acceleration measurements for a duration $\Delta t$ that lasts until time t2. The in-tire acceleration measurements, along with the tire pressure (plot 404), are used to determine $\gamma$ for a plurality of time windows within the duration, as described with respect to FIG. 3. The $\gamma$ value determined for each of the plurality of time windows constructs plot 406. Note that while the example of timeline 400 shows γ plotted in real-time, in other examples, there may be a time delay. In the example of plot 406, γ remains below a γ threshold (dashed line 407), indicating that the shock absorber is able to nominally dampen oscillations in the in-tire accelerations. Thus, shock absorber degradation is not indicated (plot 410). Furthermore, the inferred state of health may be updated based on γ, a γ history, and drive statistics of the vehicle. In the example shown in timeline 400, the inferred state of health (plot 414) is decreased at time t2, such as due to changes in γ compared to the γ history and an amount of time the vehicle has been driven since the health of the shock absorber was last assessed. A decrease in the inferred state of health may include an amount of time (or distance of travel) decreasing before the shock absorber end of life is expected.

For comparison, if instead γ exceeded the γ threshold, as shown in dashed segment 406b, shock absorber degradation would be indicated at time t2 (dashed segment 410b). Furthermore, the inferred state of health would indicate the end of the shock absorber life, as shown in dashed segment 414b. As such, a vehicle operator may be notified to service the vehicle so that the shock absorber may be replaced.

In this way, a more reliable approach for assessing a remaining useful life of a shock absorber is provided. By relying on an existing sensor of a TPMS system for estimating tire pressure and inferring the state of health of the shock absorber, the same sensor can be leveraged for both functions. By using a TPMS sensor that is coupled inside a vehicle tire, road contact properties may be more accurately coupled to assessing the shock absorber health. The technical effect of using an in-tire pressure sensor to measure the tire pressure and the oscillatory behavior of the tire is that changes in the oscillatory behavior of the tire may be accurately determined and related to a state of health of a corresponding shock absorber. The calibration increases the accuracy of estimating the remaining useful life of the shock absorber. Furthermore, the state of health can be learned without any specific knowledge of shock absorber geometry and material properties. By learning the remaining useful life of the shock absorber, the shock absorber may be replaced in a timely manner, improving vehicle performance and fuel economy.

In one example, a method for a vehicle comprises: inferring a state of health of a shock absorber coupled to a vehicle tire based on a tire pressure measured by a sensor coupled to the vehicle tire and acceleration measurements from the sensor. In the preceding example, additionally or optionally, the sensor coupled to the vehicle tire is included in a tire pressure measurement system. In any or all of the preceding examples, additionally or optionally, the sensor coupled to the vehicle tire is coupled inside the vehicle tire. In any or all of the preceding examples, additionally or optionally, the inferring is responsive to a set of operating conditions being met, the set of operating conditions including a vehicle speed higher than a threshold speed and the vehicle traveling in a substantially straight line (e.g., within 5% of a straight line over a threshold distance such as one or more rotations of the tire). In any or all of the preceding examples, additionally or optionally, inferring the state of health of the shock absorber based on the tire pressure measured by the sensor and the acceleration measurements from the sensor includes: acquiring the acceleration measurements over a duration in response to the tire pressure being greater than a threshold pressure; estimating an oscillatory behavior of the vehicle tire based on the acceleration measurements acquired over the duration and the tire pressure; and indicating one of shock absorber degradation and a remaining life of shock absorber based on the estimated oscillatory behavior and an oscillatory behavior history. In any or all of the preceding examples, additionally or optionally, estimating the oscillatory behavior of the vehicle tire based on the acceleration measurements acquired over the duration and the tire pressure includes: determining frequency components of the acceleration measurements acquired over the duration; and determining an average magnitude of the frequency components within a frequency range of interest, the frequency range of interest adjusted based on the tire pressure. In any or all of the preceding examples, additionally or optionally, indicating one of shock absorber degradation and the remaining shock absorber life based on the estimated oscillatory behavior and the oscillatory behavior history includes: indicating degradation of the shock absorber responsive to the estimated oscillatory behavior being greater than a threshold, the threshold calibrated based on the oscillatory behavior history; and indicating the remaining life of the shock absorber responsive to the estimated oscillatory behavior being less than the threshold, the remaining life estimated based on the estimated oscillatory behavior, the oscillatory behavior history, and drive statistics of the vehicle. In any or all of the preceding examples, the method additionally or optionally further comprises, responsive to indicating degradation of the shock absorber, adjusting a vehicle height via an active suspension system. In any or all of the preceding examples, additionally or optionally, the remaining life of the shock absorber is a time of vehicle operation or a distance of vehicle travel before shock absorber degradation is expected. In any or all of the preceding examples, additionally or optionally, the oscillatory behavior history includes one or both of a vehicle-specific oscillatory behavior history stored in memory and a location-specific oscillatory behavior history accessed via a wireless network.

As another example, a method comprises: indicating degradation of a shock absorber coupled to a tire in a vehicle based on selected accelerations of the tire sensed responsive to a tire pressure within a selected pressure range, the accelerations sensed over a duration via a tire pressure sensor; and adjusting an active suspension of the vehicle in response to the degradation. In the preceding example, additionally or optionally, indicating degradation of the shock absorber based on the selected accelerations of the tire includes indicating degradation of the shock absorber based on the accelerations of the tire within a desired frequency range. In any or all of the preceding examples, additionally or optionally, the desired frequency range is adjusted based on one or more of an average tire pressure sensed over the duration via the tire pressure sensor and a speed of the vehicle. In any or all of the preceding examples, additionally or optionally, indicating degradation of the shock absorber based on the selected accelerations of the tire includes indicating degradation responsive to an increase in an oscillatory behavior of the accelerations. In any or all of the preceding examples, additionally or optionally, the increase in the oscillatory behavior of the accelerations is determined based on a history of the oscillatory behavior. In any or all of the preceding examples, additionally or optionally, adjusting the active suspension of the vehicle in response to the degradation includes increasing a height of the active suspension.

As another example, a vehicle system, comprises: a tire pressure measurement sensor coupled to a tire; a shock absorber coupled to the tire; and a controller storing executable instructions in non-transitory memory that, when executed, cause the controller to: estimate an oscillatory behavior of the vehicle tire based on a pressure of the vehicle tire and an acceleration of the vehicle tire, both of the pressure and the acceleration measured by the tire pressure measurement sensor in response to the pressure above a threshold pressure, a vehicle speed above a threshold speed, and wheel torque above a threshold wheel torque; and infer a state of health of the shock absorber based on the estimated oscillatory behavior and an oscillatory behavior history. In the preceding example, additionally or optionally, the instructions that cause the controller to infer the state of health of the shock absorber based on the estimated oscillatory behavior and the oscillatory behavior history include further instructions stored in non-transitory memory that, when executed, cause the controller to: indicate degradation of the shock absorber responsive to the estimated oscillatory behavior exceeding a threshold, the threshold calibrated based on the oscillatory behavior history; and estimate a remaining useful life before an end of life of the shock absorber responsive to the estimated oscillatory behavior remaining below the threshold. In any or all of the preceding examples, additionally or optionally, the instructions that cause the controller to estimate the oscillatory behavior of the vehicle tire based on the pressure of the vehicle tire and the acceleration of the vehicle tire include further instructions stored in non-transitory memory that, when executed, cause the controller to: determine frequency components of the acceleration of the vehicle tire over a duration; determine an average magnitude of the frequency components within a frequency range selected based on the pressure for a plurality of time windows within the duration; and estimate the oscillatory behavior based on the average magnitude for each of the plurality of time windows. In any or all of the preceding examples, additionally or optionally, each of the plurality of time windows is a fraction of the duration, the plurality of time windows distributed throughout the duration in an overlapping or a non-overlapping fashion.

In another representation, a method comprises: estimating an oscillatory behavior of a vehicle tire based on an output of a sensor coupled to the vehicle tire; and inferring a state of health of a shock absorber coupled to the vehicle tire based on the estimated oscillatory behavior and an oscillatory behavior history. In the preceding example, additionally or optionally, the output of the sensor includes both of a pressure measurement and a contact acceleration measurement. In any or all of the preceding examples, additionally or optionally, the estimating is responsive to a set of operating conditions being met, the set of operating conditions including a vehicle speed higher than a threshold speed and the vehicle traveling in a substantially straight line. In any or all of the preceding examples, additionally or optionally, the inferring is further responsive to the pressure measurement being greater than a threshold pressure. In any or all of the preceding examples, additionally or optionally, estimating the oscillatory behavior of the vehicle tire based on the output of the sensor includes: measuring a contact acceleration and a pressure of the tire via the sensor over a duration; determining frequency components of the contact acceleration measured over the duration; and determining an average magnitude of the frequency components within a frequency range of interest. In any or all of the preceding examples, additionally or optionally, the frequency range of interest is adjusted based on a speed of the vehicle. In any or all of the preceding examples, additionally or optionally, the frequency range of interest is adjusted to higher frequencies when the vehicle speed is higher and adjusted to lower frequencies when the vehicle speed is lower. In any or all of the preceding examples, additionally or optionally, inferring the state of health of the shock absorber coupled to the vehicle tire based on the estimated oscillatory behavior and the oscillatory behavior history includes: indicating degradation of the shock absorber responsive to the estimated oscillatory behavior being greater than a threshold, the threshold calibrated based on the oscillatory behavior history; and estimating a remaining life before an end of life of the shock absorber responsive to the estimated oscillatory behavior being less than the threshold.

In one example, the tire pressure levels used for monitoring the tire pressure (e.g., indicating a tire pressure is within an acceptable range) overlap with the pressure levels used for enabling monitoring of acceleration for determining degradation of the shock absorber. If, for example, the tire pressure is outside an acceptable range and notice is provided to the operator of this status, then shock absorber monitoring may be disabled. Such determinations and adjustments can be made on an individual wheel basis, such that while one wheel is not being monitored, one or more other wheels of the same vehicle maybe monitored and tracked for determining respective shock absorber state.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
determining tire pressure measurements from a sensor, the sensor coupled to a vehicle tire;
determining acceleration measurements from the sensor; and
inferring a state of health of a shock absorber, the shock absorber coupled to the vehicle tire, based on the determined tire pressure and acceleration measurements from the sensor, including:
acquiring the acceleration measurements over a duration in response to the tire pressure measurements being greater than a threshold pressure;
estimating an oscillatory behavior of the vehicle tire based on the acceleration measurements acquired over the duration and the tire pressure measurements;
indicating degradation of the shock absorber responsive to the estimated oscillatory behavior being greater than a threshold, the threshold calibrated based on an oscillatory behavior history; and
indicating a remaining life of the shock absorber responsive to the estimated oscillatory behavior being less than the threshold, the remaining life of the shock absorber estimated based on the estimated oscillatory behavior, the oscillatory behavior history, and drive statistics of the vehicle, the remaining life of the shock absorber being a time of vehicle operation or a distance of vehicle travel before shock absorber degradation is expected.

2. The method of claim 1, wherein the sensor coupled to the vehicle tire is included in a tire pressure measurement system, and wherein the shock absorber coupled to the vehicle tire is separated from the sensor.

3. The method of claim 1, wherein the sensor coupled to the vehicle tire is coupled inside the vehicle tire.

4. The method of claim 1, wherein the inferring is responsive to a set of operating conditions being met, the set of operating conditions including a vehicle speed higher than a threshold speed and the vehicle traveling in a substantially straight line.

5. The method of claim 1, wherein estimating the oscillatory behavior of the vehicle tire based on the acceleration measurements acquired over the duration and the tire pressure measurements includes:
determining frequency components of the acceleration measurements acquired over the duration; and
determining an average magnitude of the frequency components within a frequency range of interest, the frequency range of interest adjusted based on the tire pressure measurements.

6. The method of claim 1, further comprising, responsive to indicating degradation of the shock absorber, adjusting a vehicle height via an active suspension system.

7. The method of claim 1, wherein the oscillatory behavior history includes one or both of a vehicle-specific oscillatory behavior history stored in memory and a location-specific oscillatory behavior history accessed via a wireless network.

8. A method, comprising:
estimating an oscillatory behavior of a tire in a vehicle based on selected accelerations of the tire sensed over a duration via a tire pressure sensor and a tire pressure measured by the tire pressure sensor, the selected accelerations selected responsive to the tire pressure being within a selected pressure range including the tire pressure greater than a threshold tire pressure setting;
indicating degradation of a shock absorber coupled to the tire responsive to the estimated oscillatory behavior being greater than a threshold, the threshold calibrated based on an oscillatory behavior history, wherein the shock absorber coupled to the tire is separate from the tire pressure sensor;
adjusting an active suspension system of the vehicle in response to the degradation; and
indicating a remaining life of the shock absorber responsive to the estimated oscillatory behavior being less than the threshold, the remaining life of the shock absorber estimated based on the estimated oscillatory behavior, the oscillatory behavior history, and drive statistics of the vehicle, the remaining life of the shock absorber being a time of vehicle operation or a distance of vehicle travel before shock absorber degradation is expected.

9. The method of claim 8, wherein the selected accelerations of the tire are within a desired frequency range.

10. The method of claim 9, wherein the desired frequency range is adjusted based on one or more of an average tire pressure sensed over the duration via the tire pressure sensor and a speed of the vehicle.

11. The method of claim 8, wherein adjusting the active suspension system of the vehicle in response to the degradation includes increasing a height of the active suspension system.

12. A method for a vehicle, comprising:
determining tire pressure measurements from a sensor, the sensor coupled to a vehicle tire;
determining acceleration measurements from the sensor; and
inferring a state of health of a shock absorber, the shock absorber coupled to the vehicle tire, based on the determined tire pressure and acceleration measurements from the sensor, including:
acquiring the acceleration measurements over a duration in response to the tire pressure measurements being greater than a threshold pressure;
estimating an oscillatory behavior of the vehicle tire based on the acceleration measurements acquired over the duration, including determining frequency components of the acceleration measurements acquired over the duration and determining an average magnitude of the frequency components within a frequency range of interest, the frequency range of interest adjusted based on the tire pressure measurements;
indicating degradation of the shock absorber responsive to the estimated oscillatory behavior being greater than a threshold, the threshold calibrated based on an oscillatory behavior history; and
indicating a remaining life of the shock absorber responsive to the estimated oscillatory behavior being less than the threshold, the remaining life of the shock absorber estimated based on the estimated oscillatory behavior, the oscillatory behavior history, and drive statistics of the vehicle, the remaining life of the shock absorber being a time of vehicle operation or a distance of vehicle travel before shock absorber degradation is expected.

13. The method of claim 12, wherein the frequency range of interest is further adjusted based on a speed of the vehicle.

14. The method of claim 12, wherein determining the average magnitude of the frequency components within the frequency range of interest comprises determining the average magnitude of the frequency components within the frequency range of interest for each of a plurality of time windows within the duration.

15. The method of claim 14, wherein each of the plurality of time windows is a fraction of the duration, the plurality of time windows distributed throughout the duration in an overlapping or a non-overlapping fashion.

16. The method of claim 12, wherein the acquiring the acceleration measurements over the duration is further in response to a speed of the vehicle being greater than a threshold speed and a wheel torque of the vehicle tire being greater than a threshold torque.

* * * * *